United States Patent [19]

Ostlund

[11] Patent Number: 5,699,178

[45] Date of Patent: Dec. 16, 1997

[54] PROCEDURE AND DEVICE FOR DISTRIBUTION AND RECEPTION OF WAVELENGTH REFERENCE IN OPTICAL MULTICHANNEL NETWORK

[75] Inventor: Leif Ostlund, Enskede, Sweden

[73] Assignee: Telia AB, Farsta, Sweden

[21] Appl. No.: 590,116

[22] Filed: Jan. 23, 1996

[30] Foreign Application Priority Data

Jan. 23, 1995 [SE] Sweden .................................. 9500208

[51] Int. Cl.$^6$ .................................................. H04B 10/00
[52] U.S. Cl. ........................... 359/161; 359/187; 359/124
[58] Field of Search ............................. 359/161, 125, 359/124, 110, 181, 184, 187

[56] References Cited

U.S. PATENT DOCUMENTS 5,239,400  8/1993  Liu ........................................... 359/125

Primary Examiner—Kinfe-Michael Negash
Attorney, Agent, or Firm—Oblon, Spivak, McClelland, Maier & Neustadt, P.C.

[57] ABSTRACT

A procedure and devices for distribution and reception of a wavelength reference in optical multichannel networks. A wavelength reference unit transmits a wavelength reference signal to at least one node which has a transmitter laser which needs a wavelength reference. The wavelength reference signal includes a carrier, the wavelength of which is varied continuously within a wavelength band and the carrier is modulated with a signal making a relationship between the momentary wavelength of the carrier and the modulating signal. The node compares the wavelength of its transmitter laser with the carrier and with a correct wavelength to which the node shall be stabilized, thus a relationship is obtained between the wavelength of the transmitter laser and the correct wavelength. The transmitter laser is controlled depending on the obtained relationship.

19 Claims, 2 Drawing Sheets

PROCEDURE AND DEVICE FOR DISTRIBUTION AND RECEPTION OF WAVELENGTH REFERENCE IN OPTICAL MULTICHANNEL NETWORK

BACKGROUND OF THE INVENTION

1. Field of the Invention

The present invention relates to a procedure and device to distribute and receive a wavelength reference in optical multichannel networks. The invention allows a stabilization of the wavelengths which are transmitted by the nodes in the network by relating the transmitted wavelengths to a reference wavelength in the network which includes a superimposed modulation signal. A measure of frequency deviation, if any, can be obtained, and the frequency of a particular transmission laser in a node can be adjusted to a desired value.

Optical telecommunications networks will, to an increasing extent, utilize more and more wavelength channels per fiber. This multichannel technology can be used to increase the transmission capacity in an optical link, but also, in a more flexible way, to distribute and control the signal flow through the network. In local networks different wavelength channels can be used to distribute different kinds of services or to direct information to different subscribers.

2. Description of the Background

To make a multi-channel network operate well, it is required that the wavelength of the signal which is transmitted on the network be stable and well separated from the wavelengths of other transmitters. Because the qualities of the light producing laser can change as time goes on due to the effects of age, as well as deviations in temperature and current, the originally correctly adjusted wavelength will be influenced. Within the field a number of documents describe solutions to the problem of the above mentioned effects of aging when distributing light signals in an optical multichannel system.

U.S. Pat. No. 4,715,028 describes a method to distribute an optical reference signal in an optical communications network. The reference signal consists of a carrier, the wavelength of which varies continuously between two known values. The carrier is introduced in the system together with a synchronization signal which, for instance, can indicate a starting point for the frequency sweep. The nodes in the network can detect possible frequency deviations by detecting the time between the synchronization pulse and the point in time when the reference signal coincides with an interval frequency. This time difference can be utilized to adjust the interval frequency.

U.S. Pat. No. 4,835,782 shows a method to stabilize the frequency at a number of laser units in an optical communications system. The method is used for increasing the transmission capacity in a frequency multiplexed system. The method distributes a reference signal which contains a number of synchronization pulses, which are superimposed on the reference signal at points in time which represent desired frequencies in the laser units. By detecting the time difference between a synchronization pulse and the point in time when the reference signal coincides with the frequency of the laser unit, a measure of the frequency error can be obtained. By that the frequency of the laser can be adjusted.

U.S. Pat. No. 5,239,400 shows a technology for accurate generation of a carrier frequency in an OFDM-system. The reference signal consists of a number of sequences with successively increasing frequency according to the resonance points for a Fabry-Perot-filter.

SU 457,043 shows a device for generation of a reference frequency intended to be used in a spectrum analyzer. The device generates a reference spectrum with a number of superimposed signals which represent a number of frequency components.

A disadvantage with the known technology is that it requires extra synchronization pulses which are transmitted separately from the wavelength reference light. Besides, linearity of the wavelength sweep is required. In a growing network there may also be a need to increase the wavelength interval between the start and stop wavelengths, which implies that the system reference source and terminals in the network also must be changed.

SUMMARY OF THE INVENTION

The present invention solves these problems by using a superimposed modulation signal on the sweeping wavelength reference light. Using that, a relationship between the modulation signal in the reference wavelength signal and the wavelength of the reference wavelength signal is established. This means that no extra synchronization signal needs to be transmitted, and that an absolute wavelength control can be achieved without the need for using the start and stop wavelengths of the reference source in the nodes.

The present invention accordingly provides a method to distribute and receive a wavelength reference in an optical multi-channel network comprising a wavelength reference unit which transmits a wavelength reference signal to at least one node which has a transmitter laser needing a wavelength reference.

According to the invention the wavelength reference signal comprises a carrier, the wavelength of which is continuously varied within a wavelength band and the carrier is modulated with a signal so a relationship between the momentary wavelength of the carrier and the modulated signal is achieved. The node compares the wavelength of its transmitter laser with the carrier and with a correct wavelength to which the node shall be stabilized, at which a relation between the wavelength of the transmitter laser and the correct wavelength is obtained. The transmitter laser is controlled depending on the obtained information.

The invention also provides devices for distribution and reception of a wavelength reference in an optical multichannel network.

BRIEF DESCRIPTION OF THE DRAWINGS

The invention is described in detail below with reference to the enclosed figures in which.

DETAILED DESCRIPTION OF PREFERRED EMBODIMENTS

Figure 1:
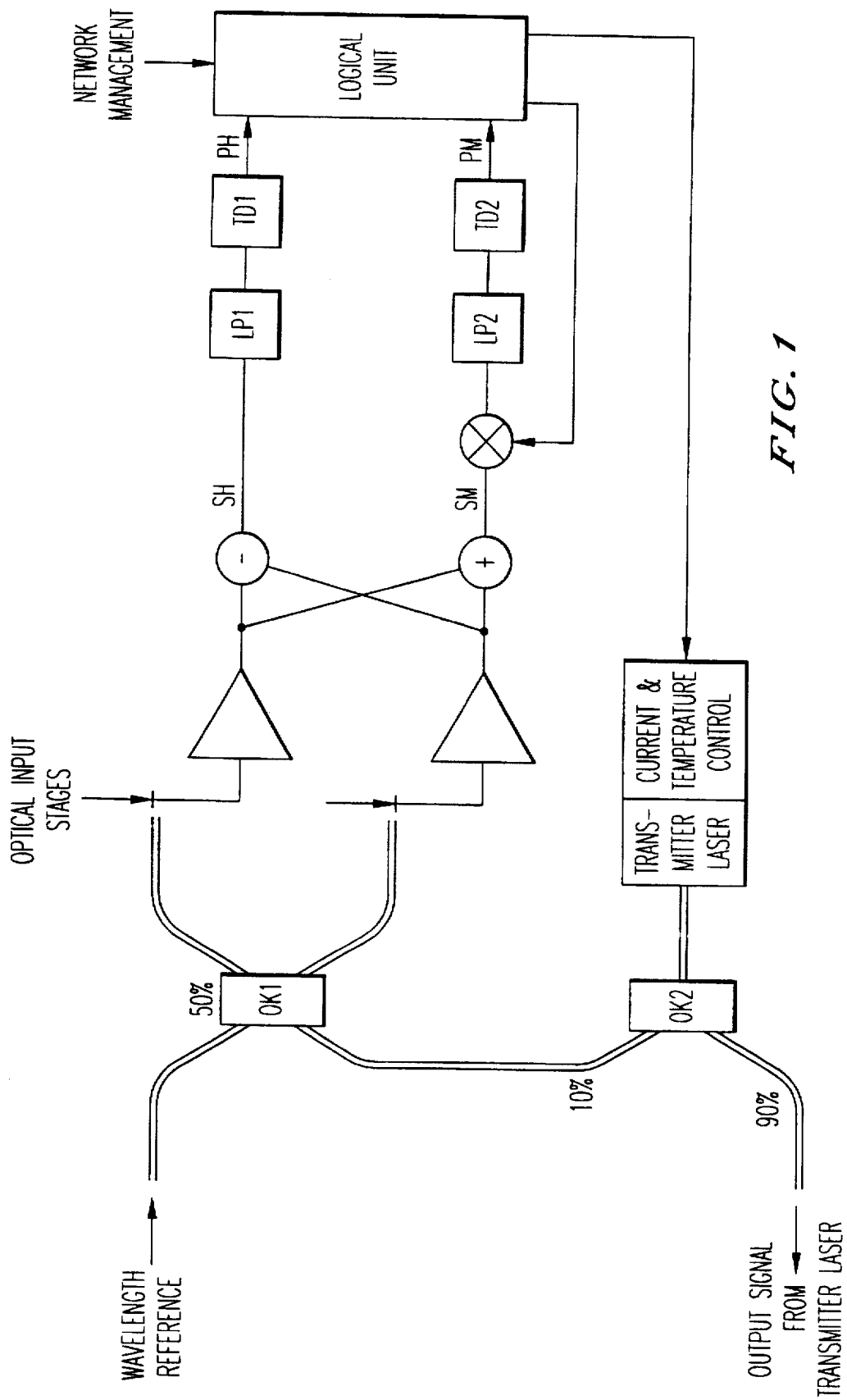
FIG. 1 is a block diagram over an embodiment of a node according to the present invention.

To get optical multichannel networks to function, it is required that the wavelength of the signal which an optical transmitter transmits be stable and well separated from the wavelengths of other transmitters. Otherwise, there is a risk that a transmitter will drift into the band of wavelengths of another transmitter which causes strong disturbances on the channels. At the same time there is another aim to arrange the channels as closely as possible in order to increase the degree of exploitation of the total available band of wavelengths. The light source in an optical transmitter for a multichannel system includes a diode laser, the wavelength of the transmitted light depends on, among other things, the driving current of the laser, temperature and age. Driving current and temperature can be adjusted to correct values at the installation of the transmitter, but since the qualities of the laser change with time, the wavelength will also change with time. In addition aging effects in temperature sensors and current stabilization circuits can cause the wavelengths to drift.

The optimal wavelength separation between the channels depends on several factors such as data rate, link distance, type of fiber, optical effect level, type of optical receiver, etc. Broadly speaking, the wavelength stability which will be required from different systems will be between 0.01–0.2 nm. This can be compared with the wavelength drift of a typical laser, which is about 0.15 nm/°C. and about 0.01 nm/mA. In order to cope with the strongest wavelength, stability is accordingly required, a temperature stability better than 0.1° C. and a current stability better than 1 mA. Consequently there is a need for control equipment which can adjust the drift in the wavelength of the transmitter laser in spite of effects of aging and drift of temperature and current.

In an optical network there can be a lot of transmitters which transmit at a number of different wavelengths. In principle it is possible to equip every transmitter with equipment for wavelength stabilization which contains its own wavelength reference. In practice this would be an expensive solution. A cheaper way is in some way to distribute the wavelength reference via the network itself, for instance in the form of one or more reference wavelengths which the local equipment can utilize to stabilize its wavelength. By that a lot of transmitters can use the same wavelength reference unit.

All the nodes in the network where there is a need to stabilize the wavelength of an optical transmitter have contact with a wavelength reference unit via an optical fiber. The practical design of the wavelength stabilization equipment in the node depends to some extent on whether this fibre consists of the same fibre as the transmitter uses for transmitting its carrier, or consists of a separate optical fibre separated from the single network itself. In the present description, it is assumed that the wavelength reference is distributed via a separate optical fiber.

Figure 2:
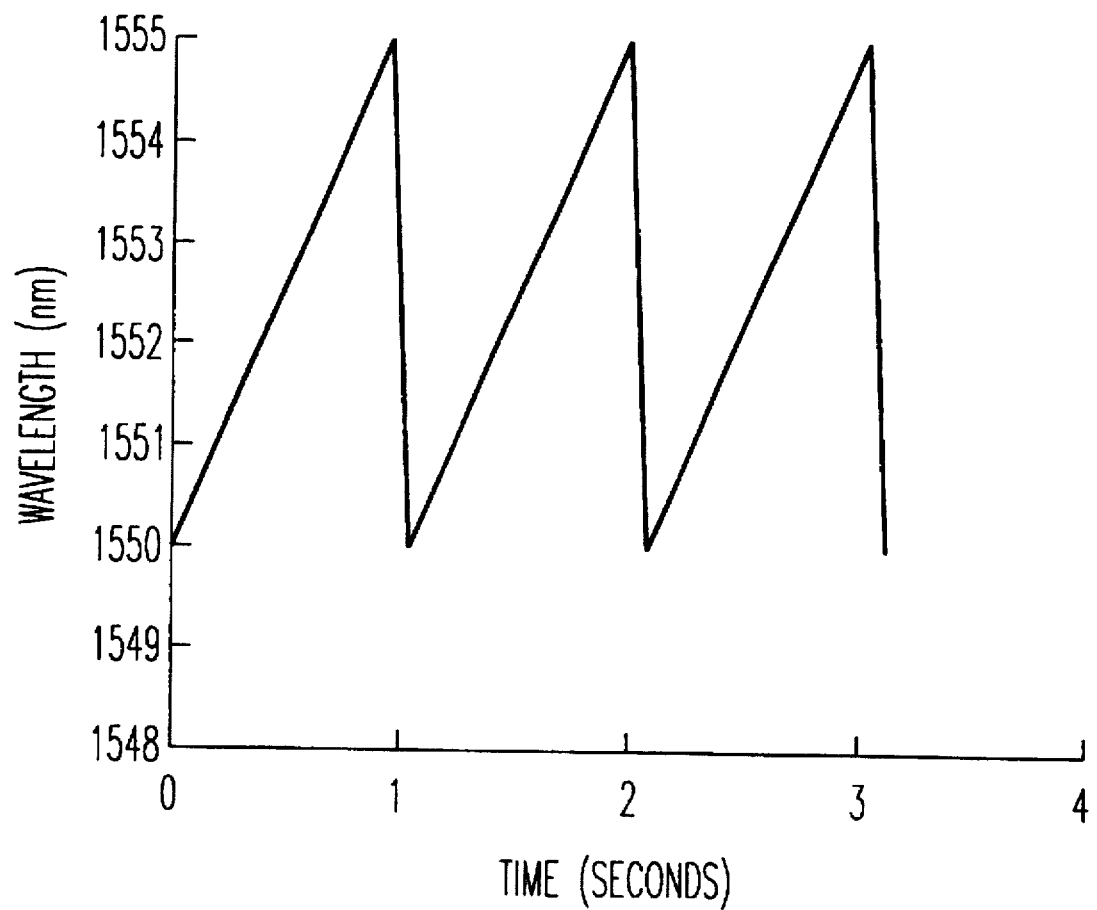
FIG. 2 is a diagram of the wavelength variation in the carrier.

The output signal from the wavelength reference unit consists of an optical carrier, the wavelength of which varies continuously with time between a minimum and a maximum value. The difference between the minimum and the maximum value is called the wavelength band of the unit and all transmitters which shall be stabilized must have a wavelength within this band. Exactly how the wavelength varies with time is not critical, but from a practical point of view, a saw tooth shaped variation can be suitable. An example of a wavelength variation as a function of time is shown in FIG. 2.

In addition to the variation in wavelength, the carrier from the wavelength reference unit is modulated in such a way that there is a relationship between the wavelength of the carrier and the modulating signal. The aim with this is that the nodes in the network should be able to read off the wavelength of the reference signal by reading the modulation signal. A number of different modulation methods are possible. One variant is intensity modulation with a sine shaped signal, the frequency of which varies with time in a way that the frequency of the intensity modulation at each moment is directly related to the wavelength of the carrier.

Another variant is pulsewidth modulation of the carrier of the wavelength reference unit, where the pulse width is directly related to the wavelength. In the preferred embodiment of the invention, intensity modulation is used, as is explained below.

In the nodes are registered the moments when the wavelength of the carrier of the wavelength reference unit coincides on one hand with the wavelength of the transmitter laser, and on the other with the wavelength to which the transmitter laser should be stabilized. The time difference between these two occurrences constitutes a measure of the wavelength error of the transmitter laser and is used by the wavelength stabilization equipment in the node for correction of the wavelength of the transmitter. The transmitter laser has a correct wavelength when the time difference is zero.

In FIG. 1 is shown an embodiment of wavelength stabilization equipment in the node. The wavelength reference is distributed via a special fiber and the carrier from the wavelength reference unit is modulated with a sine-shaped intensity modulation, the frequency of which is a function of the wavelength of the carrier (FIG. 2). The mathematical relationship between wavelength and modulation frequency (or pulse width) can be formulated in different ways. A proportional relationship is given by:

$$frequency[Hz]=wavelength[nm] \times K$$

where K is a suitable constant. However, in some cases this is not a sufficiently accurate wavelength adjustment. By instead selecting a relationship of the form:

$$frequency[Hz]=(wavelength[nm]-K1) \times K2$$

where K1 and K2 are suitably selected constants, the precision of the wavelength adjustment can be improved to a desired level.

The wavelength reference signal which is coming in to the node is divided by means of an opto coupler OK1 which distributes 50% each of the signal to optical input stages to the node. The output signal from the transmitter laser is also divided into two parts by an opto coupler OK2, where the strongest part, for instance 90%, is transmitted out on the network, whereas the weaker part is passed on to the opto coupler OK1, where it is also divided into two equal parts and is mixed with the wavelength reference signal on the photodiodes at the input stages. Due to the fact that the light of the wavelength reference and the light of the transmitter laser interfere with each other, the electrical signal from the optical input stages will contain a signal SM which is proportional to the modulation of the wavelength reference and a signal SH, the frequency of which is equal to the frequency difference between the light of the wavelength reference and the light of the transmitter laser according to the heterodyne principle. Since the SM-signal from the two input stages has the same phase whereas the SH-signal has an opposite phase, the SM- and SH-signals are separated from each other in a following addition- and subtraction stage.

The SH-signal after that passes a lowpassfilter LP1, which only allows a signal to pass when the SH-signal has a low frequency. Since the wavelength of the wavelength reference varies with time, the level of the output signal after LP1 will also vary with time. A maximum occurs every time the wavelength reference and the transmitter laser have the same wavelength. A following top detector TD1 generates a short pulse PH exactly when the SH-signal reaches this maximum. The pulse PH passes on to a logical unit, the function of which is described below.

The signal SM first goes to a multiplier, where it is multiplied by a sine signal, the frequency FM of which corresponds to the wavelength to which the transmitter laser shall be stabilized. In the multiplier a signal is generated which has a frequency which is equal to the frequency difference between FM and the modulation frequency of the wavelength reference. The low pass filter LP2 only allows a signal to pass when this frequency difference is small. Since the wavelength (and by that the modulation frequency of the wavelength reference) varies with time, the level of the output signal after LP2 will also vary with time and a maximum occurs each time the modulation frequency and FM are equal. In a following top detector TD2 a short pulse PM is generated exactly when the frequency difference is zero. The pulse PM after that is passed on to the logic unit.

The invention utilizes the fact that the pulse PH occurs in time when the wavelength reference and the transmitter laser have the same wavelength, whereas the pulse PM occurs when the wavelength reference has the wavelength to which the transmitter laser shall be stabilized. If the pulses PH and PM occur at the same correct wavelength. Otherwise, the transmitter laser is under or over in wavelength depending on whether PH comes before or after PM. The task of the logical unit is to adjust the wavelength of the transmitter laser to make PH and PM occur simultaneously. This is performed by controlling the power feeding or the temperature of the transmitter laser. Exactly how this is performed depends on the construction of the transmitter laser, as is known to persons with expert knowledge in the field.

The logical unit must know which wavelength the transmitter laser shall have. The logical unit will receive this information from the main control system of the network. Starting out from wavelength data the logical unit calculates the frequency FM and generates a sine signal with this frequency to be fed to the multiplier.

Thus, the present invention solves the problem of supplying a wavelength reference in an optical multichannel network. The method has several advantages compared with previously known technology. The additional equipment needed for the transmitters is simple and potentially cheap. The distributed wavelength reference allows the transmitters to be adjusted to an optional wavelength within a continuous wavelength interval, i.e., the wavelength band of the carrier. Just any number of the new wavelengths within the wavelength band can be introduced into the network without need to change the reference unit. No extra synchronization signal needs to be transmitted. No information about the start and stop wavelengths of the wavelength reference source needs to be transmitted. The wavelength sweep shall be continuous but need not in itself be linear. It is simple to extend the wavelength band for the carrier wavelength without needing to change the stabilization equipment in the nodes.

The wavelength reference signal can be produced in many ways, as is well known to the person with expert knowledge in the field. That is no part of the present invention. The invention is only restricted by the following patent claims.

I claim:

1. A method to distribute and receive a wavelength reference in an optical multichannel network including a wavelength reference unit which transmits a wavelength reference signal to at least one node which has a transmitter laser needing a wavelength reference, the method comprising the steps of:

varying continuously a wavelength of a carrier in a wavelength reference signal within a wavelength band, modulating the carrier with a modulating signal, according to a relation between a momentary wavelength of the carrier and the modulating signal, comparing a wavelength of a transmitter laser in a node with the wavelength of the carrier and with a correct wavelength to which the at least one node shall be stabilized, mixing a part of the output signal of the transmitter laser with the wavelength reference signal, obtaining a first signal having a frequency which is equal to a frequency differences between the wavelength of the transmitter laser and the wavelength reference signal, obtaining a second signal which is proportional to a modulation frequency of the wavelength reference signal, detecting a first point in time when the first signal has a maximum, multiplying the second signal with a signal having a frequency which corresponds to the correct wavelength, generating a third signal having a frequency which corresponds to the correct wavelength and the modulation frequency of the wavelength reference signal, detecting a second point in time when the third signal has its maximum, and controlling the transmitter laser to make the first and second points in time coincide.

2. Method according to claim 1, wherein the step of multiplying comprises:

receiving information about the correct wavelength from a control system of the optical network; and calculating the frequency, which corresponds to the correct wavelength, from the information received.

3. Method according to claim 1, wherein the step of modulating comprises modulating the carrier by intensity modulation with a sine shaped signal having a frequency which varies with time so that a modulation frequency is directly related to the wavelength of the carrier.

4. Method according to claim 3, wherein the step of modulating comprises performing intensity modulation at a frequency f as a function of the wavelength $\pi$ of the carrier, according to at least one of $$f = \pi \times K,$$

and $$f = (\pi - K1) \times K2$$

where K, K1 and K2 are constants.

5. Method according to claim 1, wherein the step of modulating comprises modulating the carrier by pulse width modulation so that a pulse width is directly related to the wavelength of the carrier.

6. Method according to claim 1, wherein the step of varying comprises varying the wavelength of the carrier as a sawtooth shaped function of time within the wavelength band.

7. System for reception of a wavelength reference in an optical multichannel network including a wavelength reference unit for transmission of a wavelength reference signal to at least one node which has a transmitter laser needing a wavelength reference, the system comprising:

means for comparing a wavelength of a transmitter laser with a wavelength of a modulated wavelength in a wavelength reference signal and with a correct wavelength to which the at least one node shall be stabilized;

means for obtaining a relation between the wavelength of the transmitter laser and the correct wavelength, said means for obtaining comprising:

means for mixing a part of an output signal of the transmitter laser with the wavelength reference signal;

means for generating a first signal having a frequency which is equal to a frequency difference between the wavelength of the transmitter laser and the wavelength reference signal;

means for generating a second signal which is proportional to a modulation frequency of the wavelength reference signal, means for detecting a first point in time when the first signal is at a maximum, means for multiplying the second signal with a signal having a frequency which corresponds to the correct wavelength;

means for generating a third signal having a frequency which is equal to the difference between the frequency which corresponds to the correct wavelength and the modulation frequency of the wavelength reference signal, and means for detecting a second point in time when the third signal is at a maximum; and means for varying the output signal of the transmitter laser so that the first and second points in time coincide.

8. System for distribution of a wavelength reference according to claim 7, further comprising means for providing information about a correct wavelength of a respective transmitter laser for calculation of a corresponding frequency in the at least one node.

9. The system according to claim 7, further comprising a wavelength reference unit including means for producing the wavelength reference signal with a carrier having a wavelength which varies continuously within a wavelength band.

10. The system according to claim 9, further comprising a modulator for modulating the carrier with a modulating signal making a relationship between a momentary wavelength of the carrier and the modulating signal.

11. System for distribution of a wavelength reference according to claim 10, wherein the means to modulate comprises modulator using intensity modulation with a sine shaped signal having a frequency which varies with time so that a modulation frequency directly relates to the wavelength of the carrier.

12. System for distribution of a wavelength reference according to claim 10, wherein the modulator comprises means using pulse width modulation including a pulse width which is directly related to the wavelength of the carrier.

13. The system according to claim 10 wherein the modulator comprises means for performing intensity modulation at a frequency f as a function of the wavelength $\pi$ of the carrier, according to at least one of $$f = \pi \times K,$$

and $$f = (\pi - K1) \times K2$$

where K, K1 and K2 are constants.

14. The system according to claim 9, wherein the means for producing comprises means for varying the wavelength of the carrier as a sawtooth shaped function of time within the wavelength band.

15. A method to distribute and receive a wavelength reference in an optical multichannel network including a wavelength reference unit which transmits a wavelength reference signal to at least one node which has a transmitter laser needing a wavelength reference, the method comprising the steps of:

comparing a wavelength of a transmitter laser with a wavelength of a modulated wavelength in a wavelength reference signal and with a correct wavelength to which the at least one node shall be stabilized;

mixing a part of an output signal of the transmitter laser with the wavelength reference signal;

generating a first signal having a frequency which is equal to a frequency difference between the wavelength of the transmitter laser and the wavelength reference signal;

generating a second signal which is proportional to a modulation frequency of the wavelength reference signal;

detecting a first point in time when the first signal is at a maximum;

multiplying the second signal with a signal having a frequency which corresponds to the correct wavelength;

generating a third signal having a frequency which is equal to the difference between the frequency which corresponds to the correct wavelength and the modulation frequency of the wavelength reference signal;

detecting a second point in time when the third signal is at a maximum; and varying the output signal of the transmitter laser so that the first and second points in time coincide.

16. The method according to claim 15, further comprising the step of producing the wavelength reference signal with a carrier having a wavelength which varies continuously within a wavelength band.

17. The method according to claim 16, further comprising the step of modulating the carrier with a modulating signal making a relationship between a momentary wavelength of the carrier and the modulating signal.

18. The method according to claim 16, wherein the step of producing comprises the step of varying the wavelength of the carrier as a sawtooth shaped function of time within the wavelength band.

19. The method according to claim 15, further comprising the step of performing intensity modulation at a frequency f as a function of the wavelength $\pi$ of the carrier, according to at least one of $$f = \pi \times K,$$

and $$f = (\pi = K1) \times K2$$

where K, K1 and K2 are constants.

* * * * *